United States Patent Office 3,143,193
Patented Aug. 4, 1964

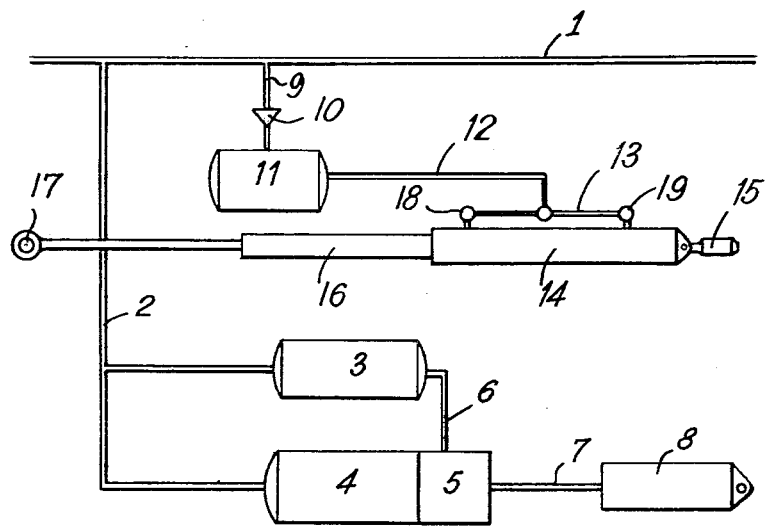
Fig. 1.
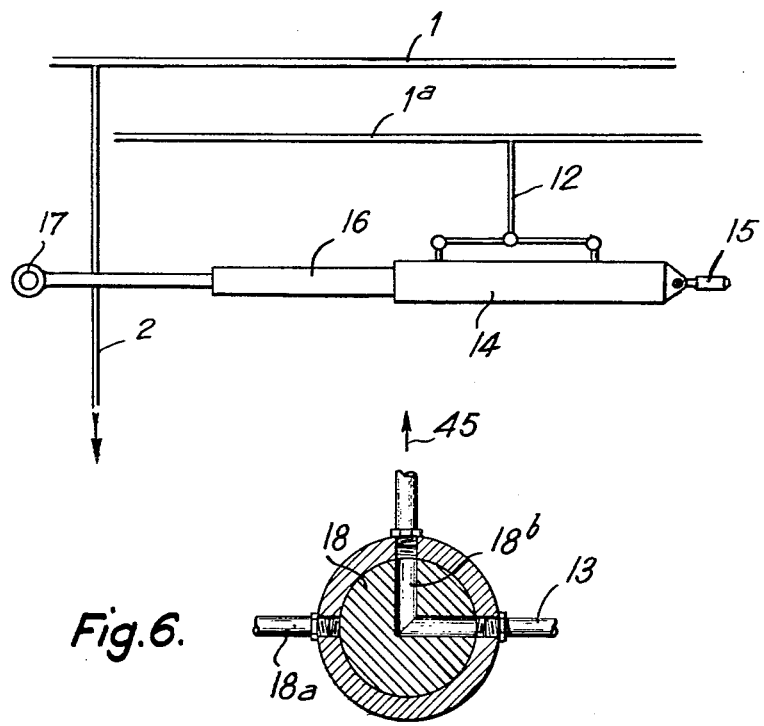
Fig. 2.
Fig. 6.

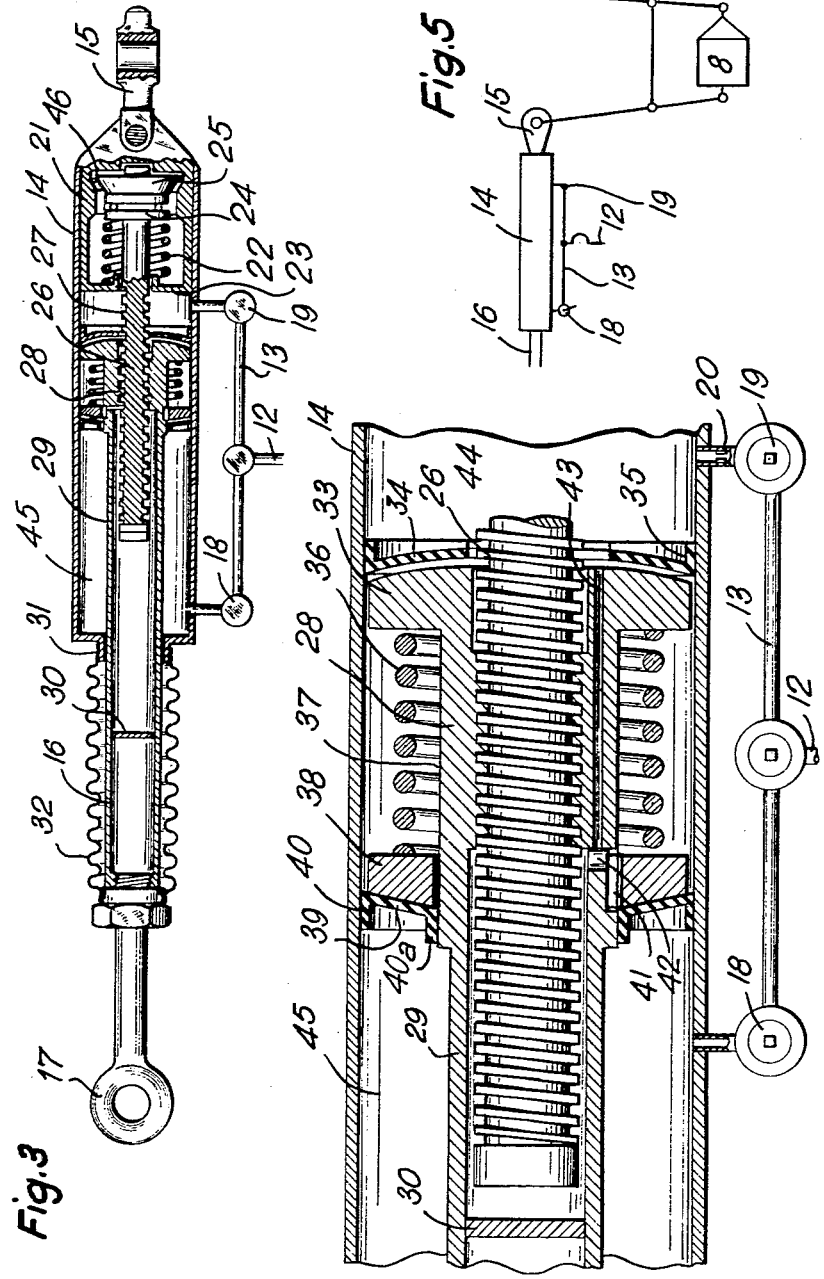

3,143,193
APPARATUS FOR PNEUMATICALLY ADJUSTING BRAKE LINKAGES
Jules Emile Joseph Feuilly, Paris, France, assignor to Societe Generale "Isothermos," Paris, France
Filed July 18, 1962, Ser. No. 210,763
Claims priority, application France July 25, 1961
10 Claims. (Cl. 188—196)

This invention relates to apparatus for adjusting brake linkages.

A linkage adjuster usually consists of a rod of variable length which is interposed in a brake linkage system and the changes in the length of which are designed to compensate for such wear and motion as would otherwise cause variations in the magnitude of the brake cylinder piston stroke.

Numerous devices of different design have already been built and utilized, and certain of these devices provide a very high degree of precision in the adjustment of the stroke of the brake piston.

These qualities are no longer indispensable on modern railroad equipment, for the brakes now possess characteristics which differ greatly from those of the brakes used previously. This is due in particular to the fact that modern brakes possess what is known as the quality of "moderability" in the brake release phase.

Indeed the characteristics of modern brakes are such that the high degree of precision previously required of linkage adjusters can now be attenuated, and both the adjustment method and the apparatus for performing the same—which form the objects of this invention—take due account of this new facility. Indeed the efficiency of a modern brake is no longer governed to the same extent by the piston stroke in most of the instances when the brakes are applied in service. In addition, brake locking, which could occur as the result of short piston strokes, is eliminated by the presence of a pressure limiter on each brake cylinder. As a result, the influence of short strokes becomes confined solely to the exertion of mechanical pressures liable to introduce undesirable friction.

Taking due account of the facilities thereby acquired, it is one object of this invention to provide a pneumatic adjustment method for brake linkages, more particularly for use on rolling stock, wherein the length of an adjuster basically consisting of a locking member and a pneumatic motor is modified principally during the pressurizing period or pressure-release period in a braking operation.

As these periods must take place before and after each braking operation, modern brakes offer an adjustment capacity that is regarded as entirely adequate.

The invention also relates to apparatus comprising, in an adjuster, an ordinary locking member actuated by the stress developed in the adjuster itself, and a pneumatic motor for lengthening and shortening said adjuster.

In one specific embodiment, more particularly for use with a braking system comprising a single master duct, the pneumatic motor is connected to said duct through an auxiliary buffer tank, in conjunction with the use of a check valve.

In an alternative embodiment comprising two master ducts (a main master duct and an auxiliary master duct), the said motor can be connected to the auxiliary duct, with or without a buffer tank, in which case the check valve is no longer necessary.

The description which follows with reference to the accompanying drawings, which are filed by way of example and not of limitation, will give a clear understanding of how the invention can be carried into practice.

In the drawings filed herewith:

FIG. 1 is a schematic illustration of the control and adjustment components of a braking system as used on a railroad vehicle and in which distribution and control are provided by a single master duct.

FIG. 2 shows an alternative embodiment, utilizing two master ducts.

FIG. 3 is a schematic sectional view of a compressed air type adjuster.

FIG. 4 is a sectional view of a detail of the piston of the adjuster in FIG. 3, in which the air inlet ports in the cylinder are represented schematically as being clustered more closely than in reality.

FIG. 5 is a fragmentary schematic illustration of the dispositon of such an adjuster when incorporated in a brake linkage system together with a compressed air actuating cylinder.

FIG. 6 is a diagrammatic illustration of a cock adapted to momentarily render such an adjuster inoperative.

Referring first to FIG. 1, a brake system may comprise a master duct 1 which is connected through a tap line 2 to an auxiliary tank 3 and to a tank 4 adjacent a main distributor 5, which distributor is in turn connected through a pipe 6 to said auxiliary tank and through a pipe 7 to the brake cylinder 8. It will be seen that this portion of the system is entirely conventional.

The master duct 1 is connected, through a pipe 9 incorporating a check valve 10, to a buffer tank 11 which is connected through a pipe 12 and a distributor bank 13 to the interior spaces of a linkage adjuster. Said adjuster comprises a cylinder 14 joined to the attachment yoke 15, which cylinder cooperates with a simple sliding piston 16 rigid with the connecting eye 17. Said bank 13 comprises, at one extremity thereof, a cock 18 allowing for full intake, and, at the other extremity, a cock 19 associated to a constricted inlet port 20.

In the specific case where the master duct 1 is associated either to a so-called auxiliary master duct 1a, to a supply duct, or to a balancing duct, the adjuster can be linked up through the pipe 12 to said duct 1a without an interposed check valve and without a buffer tank, as shown in FIG. 2. A buffer tank can be provided, however, if desired.

From the functional standpoint, such an adjuster possesses the following basic charcteristic: instead of governing operation of the adjuster during the brake application and release phases, the operations carried out on said adjuster for lengthening or shortening the linkage are mainly performed outside the braking function, said operations being accomplished in their entirety, or near entirety, when the system is filled with, or bled of, compressed air.

It is to be noted in this connection that with brakes resorted to heretofore, the use of such an adjuster would have been more difficult notwithstanding the fact that the very principle of the adjustment—i.e. the fact that the latter is performed mainly outside of brake applications and releases—provides, on the contrary, the possibility of rendering operation of the adjuster and operation of the brake independent, thereby overcoming the drawbacks resulting from the incorporation of an additional element liable to interfere with operation of the principal components of a brake system.

Referring now to FIG. 3, the adjuster shown thereon comprises, in the cylinder 14 and in that portion thereof which is adjacent to the yoke 15, a housing 21 containing a compression spring 22 interposed between the housing end 23 and a thrust ball-bearing 24 which is positioned beneath the conical head 25 of a rod 26. Said rod extends through the end 23 and is provided with a screw thread 27 which is cut with an inclination sufficient for it to be reversible when it co-operates with its associated nut.

This nut 28 is cut axially into the head of a hollow rod 29 which is provided with an end face 30 (thereby being rendered blind). Said head is provided with the packing seals on either side required to make it operate as a double-acting piston. Beyond said end face 30, the rod 29 in fact becomes the rod 16 referred to precedingly. The sliding portion of rod 29 extends through a leakproof guide 31 provided in the extremity of cylinder 14, and said sliding portion is covered by a protective spat 32.

As may be clearly seen in FIG. 4, the head into which nut 28 is cut is provided, on its extremity nearest to the partition 23, with an annular shoulder 33 associated to a flexible packing seal 34 the flattened lip 35 of which slides along the inner face of cylinder 14. On its side remote from said seal, shoulder 33 provides a support for a compression spring 36.

A cylindrical guideway 37 is provided on rod 29 beneath spring 36, and said guideway cooperates with a sliding ring 38; said ring is shaped substantially symmetrically to match the corresponding portion of shoulder 33, bears on one side against spring 36, and receives, on the other side, a packing seal 39 having two separate lips: the lip 40 which is raised on contact with the wall of cylinder 14 and the inner lip 40a which is raised on contact with an extension of guideway surface 37.

On said guideway surface, and located beneath ring 38 when the same is at the limit of its travel and spring 36 is extended to its maximum length, is provided an axial recess 41 which communicates with the inside of hollow rod 29 through a radial port 42 which, should the clearance between screw 26 and nut 28 be inadequate for passage of the compressed air, is connected through an axial duct 43 extending through the thickness of the nut and through the shoulder 33 and opening into the space 44 comprised between shoulder 33 and partition 23. The cock 19 and the constriction 20 open into the space 44, adjacent to said partition 23. Conversely, cock 18 opens into the opposite space 45, adjacent to the partition which constitutes the end face of the cylinder in which guideway 31 is provided.

The length of cylinder 14 and that of screw 26 are adequate to accommodate the take-up capacity provided by the piston stroke of such an adjuster.

The ring 25 forming the head of screw 26, which may be of the radially floating or non-floating type, is angularly rigid with said rod and is contained in a lodging of housing 21 which embodies a thrust seat 46 on its side adjacent to the spring 22.

It should be noted that, by way of an additional volume, the chamber 44 comprises the interior space of tube 29 up to the partition 30. On the opposite side, this chamber is sealed by the end face of housing 21, or by a seal inside which rotates a smooth portion of screw 26, said portion being level with partition 23.

Operation of such an apparatus can best be described by starting with the assumption that the length of the adjuster is such as to provide either normal clearance or excessive clearance between the wheel rims and the brake shoes, and that the braking system is fully exhausted of compressed air. As soon as the ducts and tank are supplied with compressed air—cocks 18 and 19 being in their normal positions—adjuster chambers 44 and 45 are likewise set under pressure, but with a staggering of the pressure rises therein, due to the fact that, on the side of chamber 45, filling takes place under full flow conditions whereas on the side of chamber 44 the flow is restricted through the constriction 20, which constriction can of course be made adjustable if desired. As a result, nut 28 moves toward the end face 23, since ring 25 is free to rotate like rod 27. The passive resistance encountered will be that due to inertia and also to friction in the adjuster and the brake linkage.

This motion of the nut is continued until the brake shoes are applied against the wheel rim and a stress develops in the linkage system. This stress is of small magnitude and less than that which can be developed by spring 22, but is adequate to overcome the resistance of spring 36. Annular piston 38 is consequently able to move forward along guideway 37 and to uncover the aperture of axial port 41 in chamber 45, thereby placing the latter in direct communication with chamber 44 via port 42 and port 43. As the pressure continues to rise in chamber 44 it reaches a value which suffices to produce slight return motions of the piston and the nut 28 and a resulting clearance corresponding to a normal stroke of the brake piston. Pressure equilibrium is then established between chambers 44 and 45, and annular piston 38 then returns under the action of spring 36 and closes the port 41 once more, whereupon nut 28 will be in the desired position of adjustment.

When the braking clearances are less than normal, the process hereinbefore described takes place with the same result.

A special case must be considered however, i.e., when some operation performed on the brake linkage is subsequent to the adjustment made at the time the system was filled with compressed air, for this could result in the strokes proving too short when the brakes are applied. An example in point is the replacement of brake shoes in the course of the journey. If the stroke adopted for the brake piston 8 is sufficiently long, no special precautions need be taken. If, on the contrary, the piston stroke is short enough for undesirable friction to develop in the linkage as the result of the operation referred to precedingly this can be remedied by means of the cock 18, which is designed to enable chamber 45 to be vented through the corresponding port 18a when the brake-piston stroke is liable to be too short. This is accomplished by rotating the mobile portion 18b of the cock together with the pipe inserted therein. During such temporary venting, the adjuster is supplied only in its chamber 44, so that until cock 18 is returned to its normal position (see FIG. 6), the adjuster will increase its length so as to restore normal shoe clearance.

It should be noted that in the adjuster hereinbefore described, and in contradistinction to the designs resorted to heretofer, the adjustment screw 26 is turnable, whereas nut 28 is translatably only. Although the reverse arrangement may be provided, the embodiment hereinbefore described offers the advantage of greater compactness.

It should further be noted that rotation of reversible-thread screw 28 is made possible by the presence of spring 22, the resistance to compression of which is greater than the magnitude of the forces developed in the piston and the nut 28 as the result of the compressed air introduced into chambers 44 and 45; it is also made possible by the presence of the stop 24 and by the clearance provided between the head 25 and that end of housing 21 which is adjacent to the yoke 15.

Two forms of force transmission are possible with an apparatus as described hereinabove, corresponding respectively to:

(1) Loads less than a predetermined limit, in which case the forces are transmitted through the yoke, the stop 24, the rod 26 and the nut 28, to the eye 17; and (2) Loads greater than this limit, in which case the force is transmitted through the yoke, the seat 46, the head 25, the rod 26 and the nut 28, to the eye 17.

It should finally be noted that, by means of cocks 18 and 19, manual shortening and lengthening operations can be carried out effortlessly, by means of the compressed air thereby distributed.

It will of course be understood, furthermore, that many modifications may be made to the embodiments hereinbefore described without departing from the scope of the invention. By way of example, the reverse disposition could be adopted to permit adjustments when the system is exhausted.

What I claim is:

1. A pneumatic adjuster for a brake linkage, said adjuster comprising: pneumatic motor means including a cylinder, and a piston retractable and extendible in said cylinder to respectively decrease and increase the length of the motor means, said motor means being adapted for connection to a supply of pressure medium for adjusting the length of the motor means, first and second inlets for said motor means adapted for connection with said supply for feeding different mass flows of pressure medium to the motor means to establish different pressures in said motor means, means operatively supporting the piston within the cylinder to provide relative movement between the piston and the cylinder in response to the different mass flows and the different pressures resulting therefrom, means operatively associated with said piston and cylinder for equilibrating the different pressures, and means associated with the last said means for automatically actuating the same as the motor means reaches a length corresponding to a desired adjustment of the brake linkage.

2. A pneumatic adjuster as claimed in claim 1 comprising a single master duct leading to said supply of pressure medium, a buffer tank connected to said duct, a check valve between said tank and said duct and a pipe leading from the buffer tank to the inlets for the motor means.

3. A pneumatic adjuster as claimed in claim 1 comprising a main master duct adapted for connection with the supply of pressure medium and an additional master duct associated with the main master duct, said additional master duct being coupled to the inlets for the motor means for feeding the same with pressure fluid.

4. A pneumatic adjuster as claimed in claim 1 wherein said piston is a double acting piston in said cylinder and defines separate chambers in said cylinder on either side of said piston, said first and second inlets feeding a respective chamber, and means associated with one of said inlets for varying the pressure of the pressure medium which is fed into the associated chamber.

5. A pneumatic adjuster as claimed in claim 4 wherein said piston includes a rigid annular portion bounding the chamber fed by the inlet associated with the means for varying the pressure of the supplied pressure medium, said means for equilibrating the different pressures comprising means establishing intercommunication between the respective chambers to permit the flow of pressure medium therebetween and means normally blocking intercommunication between the chambers but movable by the difference in pressures in said chambers to establish intercommunication between the chambers.

6. A pneumatic adjuster as claimed in claim 5 wherein said means normally blocking intercommunication between the respective chambers includes a ring slidable on said piston and facing the annular portion thereof, and resilient means between the ring and the annular portion urging the ring to a position whereat intercommunication between said chambers is blocked.

7. A pneumatic adjuster as claimed in claim 5 wherein said piston includes a hollow rod, the adjuster further comprising a threaded rod within said hollow rod and threadably engaged therewith for travel in opposite directions, a locking head secured to said threaded rod, means frictionally supporting said locking head and the threaded rod secured therewith against rotation.

8. A pneumatic adjuster as claimed in claim 7 wherein said means which frictionally supports the locking head includes means pivotally supporting the locking head coaxially within the cylinder, said cylinder having one end adapted for rigid attachment with a yoke, the hollow rod of the piston being adapted for connection to a coupling eye.

9. A pneumatic adjuster as claimed in claim 1 comprising valve means for one of the inlets for selectively venting the chamber associated therewith and feeding the pressure fluid to the latter chamber.

10. A pneumatic adjuster as claimed in claim 7 wherein said piston travels on said threaded rod until the brakes are applied against the wheel rims at which time the piston becomes fixed in said cylinder to provide a specific length of the motor means, said resilient means between the ring and the annular portion of the piston being a spring having a strength which is overcome by the difference in pressure prevailing in the chambers whereby said ring undergoes sliding movement to compress said spring, said chambers being in communication as the ring is slidably moved on said piston to establish equal pressures in said chambers.

References Cited in the file of this patent

UNITED STATES PATENTS

| 1,886,936 | Bowen | Nov. 8, 1932 |
| 1,899,009 | Bradbury | Feb. 28, 1933 |
| 2,294,293 | Goepfrich | Aug. 25, 1942 |